United States Patent
Subatch, Jr. et al.

(10) Patent No.: US 9,611,806 B2
(45) Date of Patent: *Apr. 4, 2017

(54) ENGINE PISTON

(71) Applicant: Caterpillar Inc., Peoria, IL (US)

(72) Inventors: James A. Subatch, Jr., Mossville, IL (US); Matthew I. Rowan, Chillicothe, IL (US); Scott P. Coulier, Peoria, IL (US); Ashutosh Katari, West Lafayette, IN (US); Nikhil O. Lulla, Peoria, IL (US); James C. Weber, Lafayette, IN (US); Steven C. Zoz, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/546,674

(22) Filed: Nov. 18, 2014

(65) Prior Publication Data

US 2016/0138520 A1    May 19, 2016

(51) Int. Cl.
*F02F 3/00* (2006.01)
*F02F 3/28* (2006.01)
(Continued)

(52) U.S. Cl.
CPC ............. *F02F 3/28* (2013.01); *F02B 23/06* (2013.01); *F02B 23/0621* (2013.01);
(Continued)

(58) Field of Classification Search
CPC ........ F05C 2201/021; F05C 2201/0448; F02F 3/22; F02F 3/00; F02B 3/06
(Continued)

(56) References Cited

U.S. PATENT DOCUMENTS 4,711,208 A * 12/1987 Sander ............... F02B 23/0603
                                                              123/271
6,314,933 B1    11/2001 Iijima et al.
(Continued)

FOREIGN PATENT DOCUMENTS

CA           2826435 A1    11/2013
DE      102005049443 A1     4/2007
(Continued)

OTHER PUBLICATIONS

U.S. Appl. No. 14/546,621, filed Nov. 18, 2014.
U.S. Appl. No. 14/546,639, filed Nov. 18, 2014.
U.S. Appl. No. 14/546,655, filed Nov. 18, 2014.

*Primary Examiner* — Linsday Low
*Assistant Examiner* — Charles Brauch
(74) *Attorney, Agent, or Firm* — Leydig, Voit & Mayer, Ltd.

(57) ABSTRACT

A piston for an internal combustion engine includes a piston body forming a crown portion and a skirt portion. The skirt portion includes a bore that receives a pin for connecting the piston to a connecting rod, and the crown portion forms a bowl surrounded by a flat crown surface having an annular shape and disposed along a plane. The bowl and the flat crown surface meet along a circular edge surrounding a rim of the bowl. The piston further includes an annular protrusion disposed within the bowl adjacent the rim. The annular protrusion has a generally convex shape in cross section created by an upper, inwardly extending surface and a lower, inwardly extending surface that meet along a convex apex. The piston further includes an airfoil surface formed in the flat crown surface. The airfoil surface has a convex shape and extends annularly around the rim of the bowl.

18 Claims, 7 Drawing Sheets

(51) Int. Cl.
    *F02B 23/06*     (2006.01)
    *F02B 23/10*     (2006.01)
    *F02B 3/06*     (2006.01)
    *F02F 3/22*     (2006.01)

(52) U.S. Cl.
    CPC ........ *F02B 23/0696* (2013.01); *F02B 23/101*
    (2013.01); *F02F 3/0015* (2013.01); *F02B 3/06*
    (2013.01); *F02F 3/00* (2013.01); *F02F 3/22*
    (2013.01); *F05C 2201/021* (2013.01); *F05C*
    *2201/0448* (2013.01)

(58) Field of Classification Search
    USPC ...................................................... 123/193.6
    See application file for complete search history.

(56) References Cited

U.S. PATENT DOCUMENTS

| | | |
|---|---|---|
| 6,739,309 B2 | 5/2004 | Hiraya et al. |
| 6,799,550 B2 | 10/2004 | Wirth |
| 6,874,489 B2 | 4/2005 | Yonekawa et al. |
| 6,971,379 B2 | 12/2005 | Sakai et al. |
| 7,185,614 B2 * | 3/2007 | Meffert ............... F02B 23/0672 123/269 |
| 7,389,764 B1 | 6/2008 | Wickman et al. |
| 7,861,685 B2 | 1/2011 | Sono et al. |
| 7,942,126 B2 | 5/2011 | Zöller |
| 8,276,563 B2 | 10/2012 | Quigley et al. |
| 8,327,822 B2 | 12/2012 | Asai et al. |
| 8,424,506 B2 | 4/2013 | Hasegawa |
| 8,468,998 B2 | 6/2013 | Straub |
| 8,499,735 B2 | 8/2013 | Eismark et al. |
| 8,555,854 B2 | 10/2013 | Rothbauer et al. |
| 8,671,908 B2 | 3/2014 | Ives et al. |
| 8,677,970 B2 | 3/2014 | Venugopal et al. |
| 8,677,974 B2 | 3/2014 | Rothbauer et al. |
| 8,701,626 B2 | 4/2014 | Gu et al. |
| 2003/0066507 A1 * | 4/2003 | Roberts, Jr. ............. F02B 23/08 123/256 |
| 2004/0060537 A1 | 4/2004 | Liu |
| 2004/0123832 A1 | 7/2004 | Quigley et al. |
| 2010/0050861 A1 | 3/2010 | Azevedo et al. |
| 2010/0108044 A1 | 5/2010 | Liu |
| 2011/0146613 A1 | 6/2011 | Oxborrow et al. |
| 2011/0253096 A1 | 10/2011 | Easley et al. |
| 2011/0271931 A1 * | 11/2011 | Rothbauer .......... F02B 23/0636 123/279 |
| 2012/0234285 A1 | 9/2012 | Venugopal et al. |
| 2013/0019838 A1 | 1/2013 | Lee et al. |
| 2014/0026840 A1 | 1/2014 | Okada et al. |
| 2014/0216393 A1 | 8/2014 | Kamijyou et al. |

FOREIGN PATENT DOCUMENTS

| | | |
|---|---|---|
| DE | 102009050265 | 9/2010 |
| DE | 102011017479 | 10/2012 |
| EP | 1264973 B1 | 8/2007 |
| FR | 2884284 A1 | 10/2006 |
| FR | 2885958 | 11/2006 |
| FR | 2902462 A1 | 12/2007 |
| JP | 2004-190573 A | 7/2004 |
| JP | 2005-351192 A | 12/2005 |
| JP | 2011-026965 A | 2/2011 |
| JP | 5494545 B2 | 5/2014 |
| WO | WO 2014/094796 A1 | 6/2014 |
| WO | WO 2014/096956 A1 | 6/2014 |

* cited by examiner

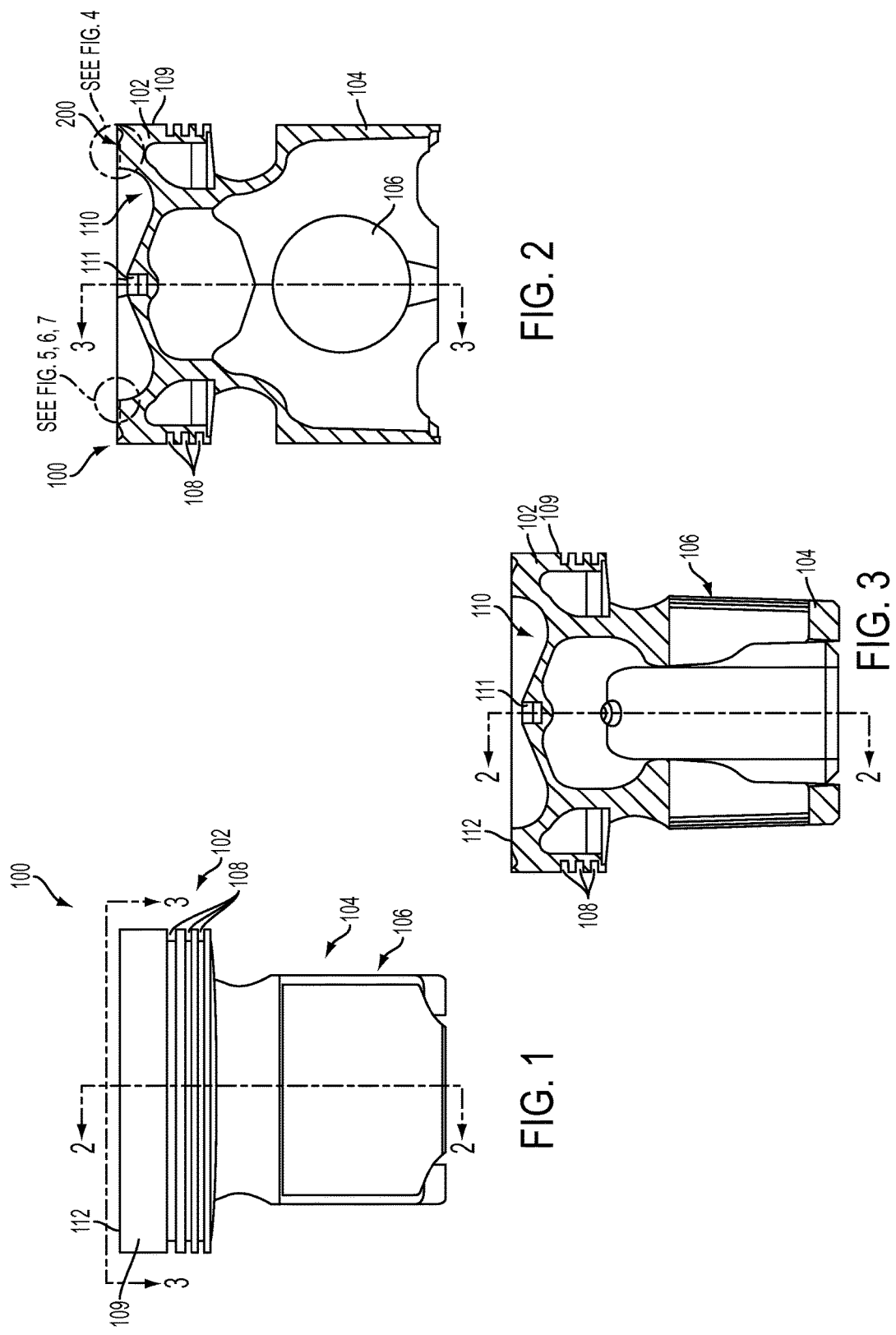

US 9,611,806 B2

ENGINE PISTON

TECHNICAL FIELD

This patent disclosure relates generally to internal combustion engines and, more particularly, to pistons operating within engine bores.

BACKGROUND

Internal combustion engines include one or more pistons interconnected by connecting rods to a crankshaft, and are typically disposed to reciprocate within bores formed in a crankcase, as is known. A typical piston includes a head portion, which at least partially defines a combustion chamber within each bore, and a skirt, which typically includes a pin opening and other support structures for connection to the connecting rod of the engine. In general, a piston is formed to have a generally cupped shape, with the piston head forming the base, and the skirt portion being connected to the base and surrounding an enclosed gallery of the piston. In typical applications, lubrication oil from the engine is provided within the gallery of the piston during operation to convectively cool and lubricate various portions of the piston.

A typical piston head also includes an outer cylindrical wall having one or more circumferentially continuous grooves formed therein. These grooves typically extend parallel to one another and are appropriately sized to accommodate sealing rings therewithin. These sealing rings create sliding seals between each piston and the crankcase bore it is operating within. Typically, the groove located closest to the skirt of the piston accommodates a scraper ring, which is arranged to scrape oil clinging on the walls of the piston bore during a down-stroke of the piston. Oil that may remain wetting the walls of the bore following the down-stroke of the piston may enter the combustion chamber and combust during operation of the engine.

In general, the piston operates by reciprocating within a bore formed in a cylinder case of the engine, which creates a variable volume that can compress a fuel/air mixture provided therein. The combusting fuel/air mixture expands and pushes the piston to increase the variable volume, thus producing power. Fuel can be provided directly or indirectly within the variable volume, while air and exhaust gas is provided or removed from the variable volume through one or more intake and exhaust valves that selectively fluidly connect the variable volume with intake and exhaust collectors.

The materials used to construct the walls of the engine cylinders, the piston, the various valves associated with the variable volume, and other surrounding engine structures, are selected to withstand high temperatures and pressures that are present during engine operation. However, it is always desired to increase the reliability and service life of these and other engine components.

BRIEF SUMMARY OF THE DISCLOSURE

In one aspect, the disclosure describes a piston for an internal combustion engine. The piston includes a piston body forming a crown portion and a skirt portion. The skirt portion includes a bore that receives a pin for connecting the piston to a connecting rod, and the crown portion forms a bowl surrounded by a flat crown surface having an annular shape and disposed along a plane. The bowl and the flat crown surface meet along a circular edge surrounding a rim of the bowl. The piston further includes an annular protrusion disposed within the bowl adjacent the rim. The annular protrusion has a generally convex shape in cross section created by an upper, inwardly extending surface and a lower, inwardly extending surface that meet along a convex apex. The piston further includes an airfoil surface formed in the flat crown surface. The airfoil surface has a convex shape and extends annularly around the rim of the bowl.

BRIEF DESCRIPTION OF THE DRAWINGS

FIG. 1 is a side view of an engine piston in accordance with the disclosure.

FIGS. 2 and 3 are fragmented views of the engine piston of FIG. 1 from two different perspectives.

DETAILED DESCRIPTION

Figure 4:
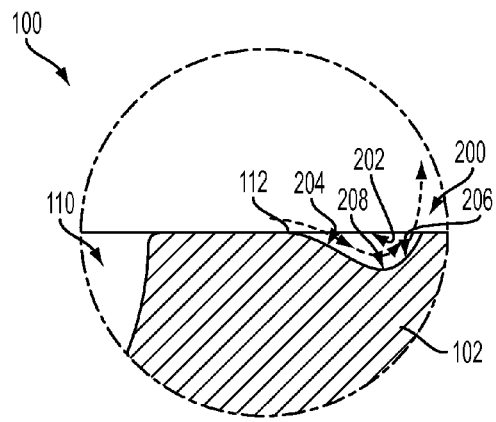
FIG. 4 is an enlarged fragmentary detailed view of a crown portion of the engine piston of FIG. 1.

This disclosure relates to pistons for use in internal combustion engines and, more particularly, direct injection compression ignition engines. Particularly, the disclosure provides various embodiments for engine pistons having features that can direct a fuel plume injected into the cylinder, a fuel atomization cloud within the cylinder while or after an injection is occurring or has occurred, or a combusting flame following ignition and during expansion of a power stroke. Such directing, fuel injection configuration, and other parameters, can use various physical features of the piston to contain and/or redirect various fuel containing masses within the piston away from the piston walls and/or the cylinder valves to increase engine efficiency, decrease heat rejection, affect emissions such as soot and NOx, and also control component temperatures, thus increasing component reliability and service life. As discussed herein, the directing of material within the cylinder may occur at least for an instant and may last no more than a few thousandths of a second while an injection of fuel and/or a combustion flame is present within the cylinder, or over portions of that period.

For purpose of illustration of certain features of an engine piston in accordance with the disclosure, an engine piston 100 is shown from a side perspective in FIG. 1, and from two different perspectives in the fragmented views shown in FIGS. 2 and 3. In reference to these figures, the piston 100 includes a crown portion 102 and a skirt portion 104. The skirt portion 104 forms a pin bore 106 that accommodates a pin (not shown) used to pivotally connect the piston to a connecting rod (not shown), which is connected to an engine crankshaft (not shown) in the known fashion. The crown portion 102 forms various grooves 108 in an outer cylindrical surface 109, which accommodate ring seals (not shown) that slidably and generally sealably engage the walls of the engine cylinder in which the piston 100 is reciprocally disposed. In reference to the orientation of the piston 100 as shown in the figures, the crown 102 forms a bowl 110 having a concave shape along the topmost surface of the piston. The bowl is surrounded by an annularly shaped, flat crown surface 112 adjacent an outer periphery of the piston 100. In the illustrated embodiment, the bowl 110 further forms an optional central depression 111.

The piston 100 forms various features that operate to redirect and/or contain various moving masses within the cylinder during operation. In various embodiments, these features operate to split the hot injector fuel plume that is provided to the cylinder when the piston is close to a top dead center position in the cylinder, and also which may be provided while the piston is approaching the top dead center position (e.g., pilot injection events) and/or is moving away from the top dead center position (e.g. post injection events during a combustion stroke). The fuel plume, a fuel atomization cloud, and/or a flame of burning fuel during these times of engine operation can be redirected in terms of flow direction and material dissipation in a fashion that reduces exposure of the various surrounding in-cylinder combustion surfaces to flame temperatures. By insulating cylinder surfaces from flame temperatures, retained heat and heat transfer to the metal of the surrounding engine components can be reduced, which in turn can provide a higher power output and/or higher power density to the engine, and also improve component reliability and service life.

Various embodiments are presented herein for piston features that have been found to effectively redirect the various described engine cylinder combustion products, which features relate to an airfoil surface formed on the top crown surface, structures placed within the bowl of the piston, and also features relating to the shape of the piston bowl and/or a combination or combinations of these features. These various features and their operation are described below.

FIG. 4 shows an enlarged detail view of an airfoil surface 200, the placement of which along the outer periphery of the crown surface 112 is shown in FIG. 2. The airfoil surface 200 has a generally concave shape that extends annularly around at least a portion of the outer periphery of the topmost portion of the piston 100. The airfoil surface 200 has a negative camber that increases in a radial direction away from a crown centerline, as shown in FIG. 4. As shown, a central chord 202 of the airfoil surface 200 coincides with the top surface 112 such that the airfoil surface 200 includes an expanding surface 204 that extends radially outwardly with respect to the piston 100 and sinks away from a plane that contains the flat surface 112. A converging surface 206 is disposed radially outwardly with respect to the expanding surface 204 and rises towards the plane that contains the flat surface 112. An inflection surface 208 is disposed between the expanding and converging surfaces 204 and 206 to form a bottom trough of the airfoil surface 200. A radius of curvature of the expanding surface 204 is larger than a radius of curvature of the converging surface 206 to create an airfoil effect that redirects moving fluids entering the airfoil surface 200 upwards and away from the piston and the cylinder walls with respect to the piston and cylinder.

During operation, for example, when the piston is moving away from the top dead center position in the engine cylinder during a combustion stroke, an expanding mass, which may contain one or more of fuel injected into the cylinder, a mass of atomized or vaporizing fuel, burning fuel and air, and other combustion products, at least for an instant, moves in a downward and outward direction with respect to a central region of the cylinder towards the piston crown and also towards the cylinder walls. In a typical condition, the expanding mass may contact the piston crown and follow the crown surface 112 in a radially outward direction. When the airfoil surface 200 is present on the piston 100, the outwardly moving mass will first encounter the expanding surface 204 and expand into a concave trough created within the airfoil surface 200 towards the inflection surface 208 at least for a short period. When it encounters the inflection surface 208, the expanding mass will contact the converging surface 206 and be redirected thereby upward and away from the piston 100. When exiting the concave trough created within the airfoil surface 200, the expanding mass will tend to move into and occupy a peripheral outward portion of the cylinder that lies radially inward with respect to the cylinder wall, thus reducing contact between the burning products and the cylinder wall, as is qualitatively denoted by the dashed-line arrows shown in the figure.

Figure 5:
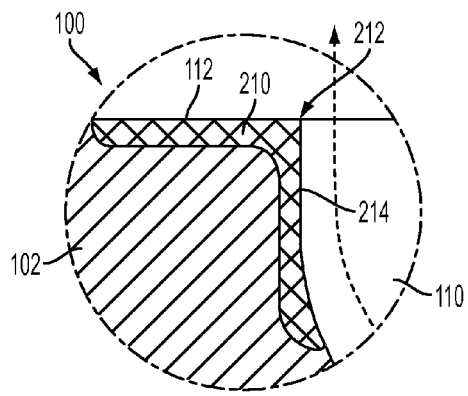
FIGS. 5-7 are enlarged fragmentary views of an interface between an piston bowl and crown for three different embodiments of the engine piston of FIG. 1.
Figure 6:
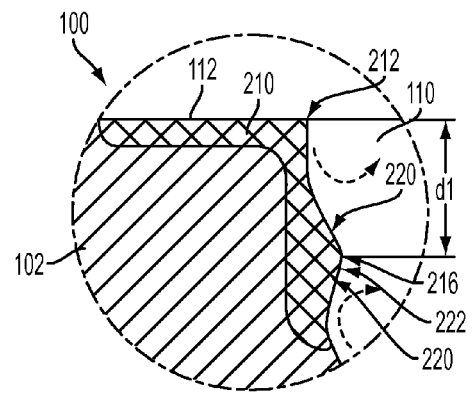
Figure 7:
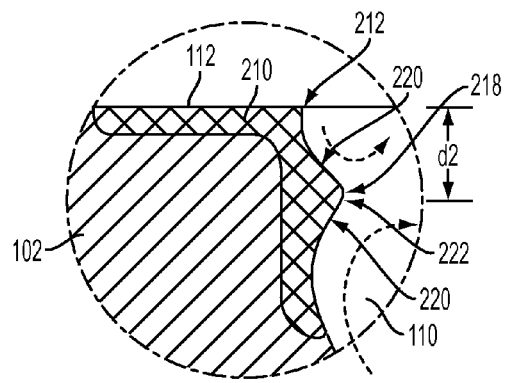

Another feature of the piston 100 is shown in three alternative embodiments in FIGS. 5-7. As shown in FIG. 5, a sleeve 210 is connected to the piston crown 102 along a rim 212 of the bowl 110. The sleeve 210, which may be omitted in favor of the structures formed thereby being integrally formed in the parent material of the piston 100, has a generally L-shaped cross section extending along the top crown surface 112 and also forming a radially outward wall of the bowl 110 that extends down into the bowl 110. In the embodiment shown in FIG. 5, the radially outward wall of the bowl 110 forms a generally cylindrical surface 214 that extends in a downward direction from the rim 212 into the bowl 110. The rim 212 forms a sharp edge transition with the topmost crown surface 112 such that the moving mass, as previously described, which may enter a central portion of the bowl 110 and move radially outwardly with respect to the bowl, at least for an instant, can be directed upward relative to the piston and away from the cylinder walls, as is qualitatively denoted by the dashed-line arrows shown in the figure.

In the embodiment shown in FIG. 6, the sleeve 210 includes an annular protrusion 216, which extends peripherally around the bowl 110 at a depth, d1, with respect to the flat crown surface 112 along a piston centerline. The depth, d1, may be about 12 mm. from the crown surface 112. In FIG. 7, an alternative embodiment for the annular protrusion 218 is shown, which in this embodiment is disposed at a depth, d2, that is less than the depth d1 as shown in the embodiment of FIG. 6. Although shown formed on the sleeve 210, the protrusions 216 or 218 may alternatively be formed as integral structures of the parent piston material. Each of the protrusions 216 and 218 has a generally convexly shaped cross section that includes two radially inwardly extending surfaces 220 disposed on either side of an apex 222. These structures cause a radially outwardly moving mass, as described above, that is travelling from about the center of the bowl 110 to recirculate back towards the center of the bowl 110 as it is redirected when contacting the lower inwardly extending surface 220. As the mass is redirected towards the center of the bowl in this fashion, it may at least temporarily create a toroidal-shaped flow disturbance or vortex, which has been found to trap therein or, stated differently, constrict dispersion of combustion products during combustion, at least temporarily.

The constriction of the dispersion of combustion products has appreciable benefits for engine operation. Some of the benefits include a more complete combustion, because the fuel is concentrated around a central cylinder portion, avoidance of contact of the combustion products with the walls of the cylinder and the cylinder head, lower emissions, and other benefits that increase the power output of the engine and decrease heat rejection. The upper inwardly extending surface 220 may further cooperate with the lower inwardly extending surface 220 to create a second vortex on the upper side of the corresponding protrusion 216 and 218, as is generally denoted by dashed line arrows in FIGS. 6 and 7, to provide a second barrier against the diffusion and migration of combustion products towards the outer radial portions of the cylinder during combustion. Placement of the annular protrusion 216 or 218 either higher or lower into the bowl generally depends on the amount of fuel injected into the cylinder, as well as on injection timing. In other words, such placement can be selected by the engine designer to suit the particular requirements of a particular engine application.

The airfoil surface 200 and annular protrusion 216 or 218 can be selectively used together or separately in various piston embodiments depending on their effect and contribution to improved engine operation. Various piston embodiments are discussed below that incorporate some of these features. In the illustrations that follow, features, structures and/or elements of the pistons described that are the same or similar to corresponding features, structures and/or elements described above may be denoted by the same reference as previously used for simplicity, but such common denotation should not be construed as limiting to the scope of the present disclosure.

Figure 8:
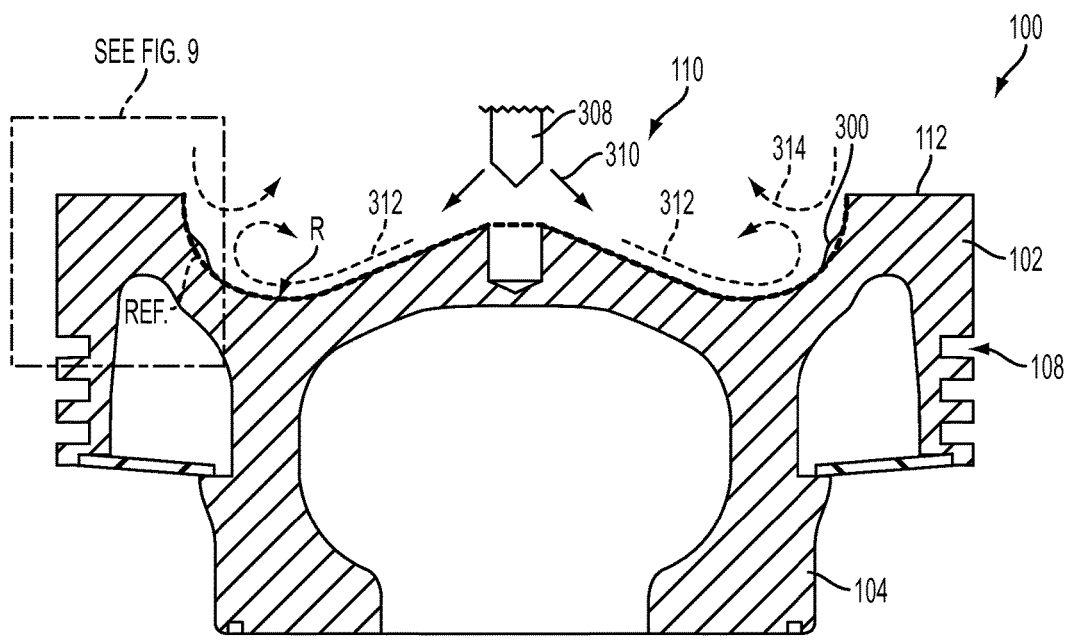
FIGS. 8 and 9 are fragmentary views of a first alternative embodiment for an engine piston in accordance with the disclosure.
Figure 9:
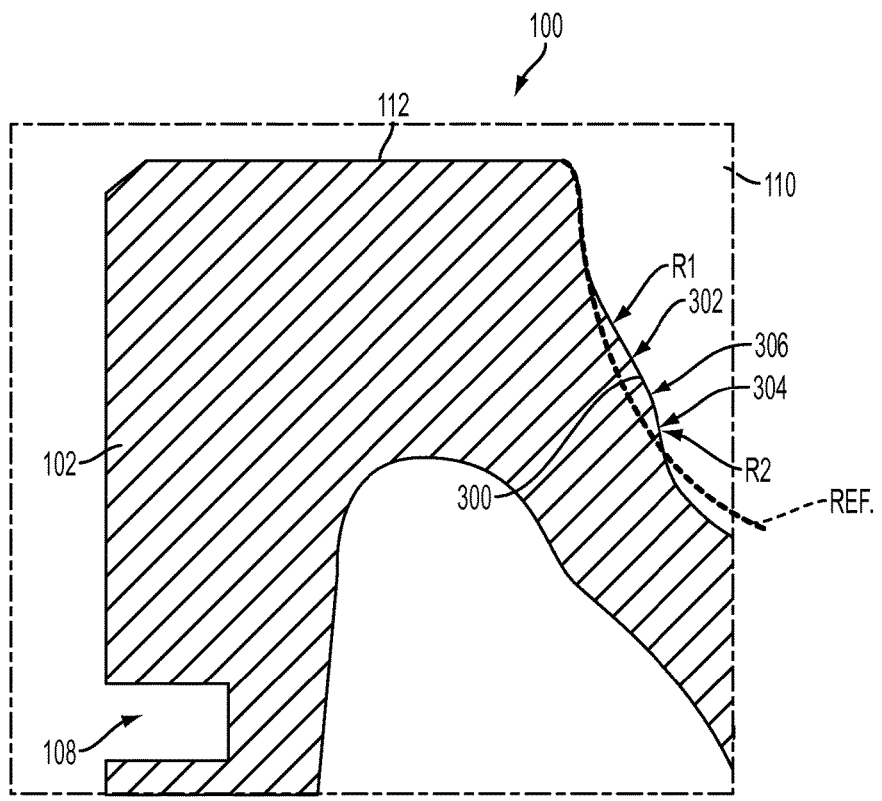

A first alternative embodiment of the piston 100 is shown in the fragmented view of FIG. 8, and a portion thereof is shown in the enlarged detail view of FIG. 9. The piston 100 in this embodiment includes an annular protrusion 300 that, as best shown in FIG. 8, has an upper converging surface 302 and a lower converging surface 304 that meet along a convex apex 306. A reference curve, denoted as "REF." in the figure, is overlaid to highlight the difference in structure between the piston 100 and a baseline piston. In the embodiment illustrated in FIG. 9, the upper converging surface 302 has a larger radius, R1, than a radius, R2, of the lower converging surface 304. In one embodiment, R1 is about 13.5 mm., and R2 is about 6.9 mm. Of course, the illustrated piston embodiment is suitable for a particular engine compression ratio, and certain dimensions change depending on the desired compression ratio for a particular engine configuration. Accordingly, in the illustrated embodiment, a bottom radius, R, of the piston bowl 110 is about 28 mm., but can alternatively be shallower, for example, at 35 mm., for engines having a higher compression ratio. During operation, the smaller radius R2 of the lower converging surface 304 causes a moving mass of combustion material, as previously described, that is travelling along the bowl 110, to be redirected back towards a central portion of the bowl 110. The relatively high velocity of the moving mass may create a low pressure region along the upper converging surface 302, at least for an instant, which will pull in surrounding material from the within the cylinder volume and also direct the same towards the central portion of the cylinder.

A qualitative illustration of the flow effects within the cylinder created by the protrusion 300 is denoted by arrows in FIG. 8. In this illustration, it is presumed that the piston 100 is moving deeper into the cylinder, for example, during a combustion stroke and while fuel is being injected into the cylinder, such as during a continued-burn injection event. In this situation, a fuel injector 308 is shown injecting one or more fuel streams 310 into the cylinder. The fuel streams 310, which may begin atomizing, mixing with surrounding air, and/or burning, may follow paths 312 along the faces of the bowl 110 until they reach the protrusion 300. When reaching the protrusion 300, the paths 312 may curl inward as they are redirected by the lower converging surface 304 of the protrusion 300, at least for an instant. At the same time, surrounding material, which can include air, may be pulled along the upper converging surface 302 along swirl paths 314 to follow the mass moving along the paths 312. The surrounding air following the moving mass along path 312 and along the swirl paths 314 may, in some conditions, further insulate and contain the burning, moving mass from dispersion in the radially outward portions of the cylinder volume by creating a moving curtain of air around the moving, burning mass. The added air around the burning mass can further serve to provide oxygen for a more complete burn of the fuel present in the moving mass, thus increasing engine efficiency.

Figure 10:
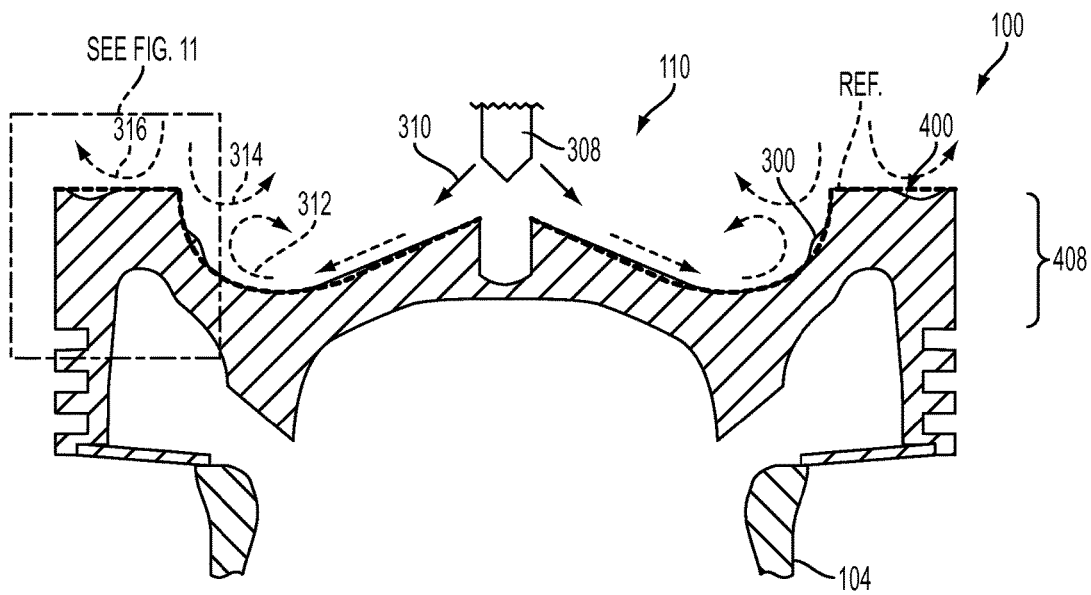
FIGS. 10 and 11 are fragmentary views of a second alternative embodiment for an engine piston in accordance with the disclosure.
Figure 11:
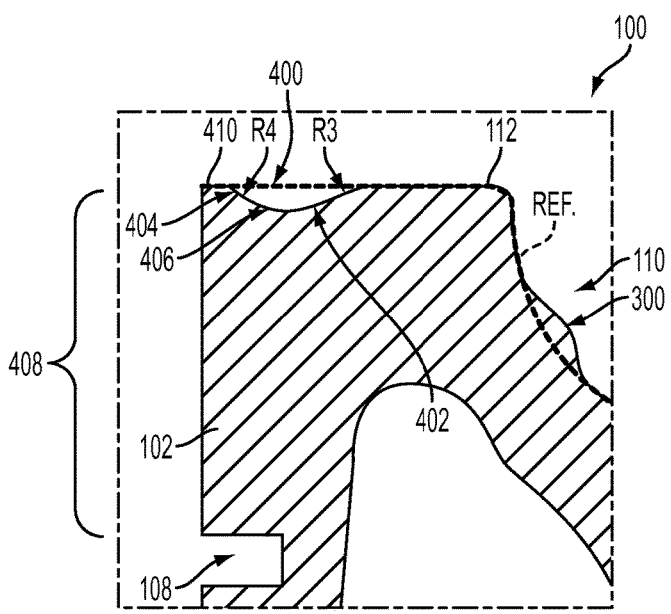

A second alternative embodiment of the piston 100 is shown in the fragmented view of FIG. 10, and a portion thereof is shown in the detail view of FIG. 11. The piston 100 in this embodiment includes the annular protrusion 300, which is discussed above relative to the embodiment shown in FIGS. 8 and 9, and further includes an airfoil surface 400. The airfoil surface 400, which is formed by an inner diverging surface 402 and an outer converging surface 404 that meet along a concave trough 406. A reference curve, denoted as "REF." in the figure, is overlaid to highlight the different in structure between the piston 100 and a baseline piston design. In the embodiment illustrated in FIG. 11, the inner diverging surface 402 has a larger radius, R3, than a radius, R4, of the outer converging surface 404. In the illustrated embodiment, R3 is about 47.3 mm. and R4 is about 2.6 mm. The overall width of the airfoil surface 400 in a radial direction is about 13.9 mm.

During operation, the smaller radius R4 of the outer converging surface 404 causes a moving mass of combustion material, as previously described, that may be travelling along the flat, crown surface 112 to be redirected upwards and away from the piston 100 and the walls of the cylinder in which the piston 100 reciprocates. The relatively high velocity of the moving mass that is redirected is, in part, attributable to the relatively shallow inner diverging surface 402, which causes fluid to travel towards and along the outer converging surface 404. By redirecting the moving mass upward and away from the piston, contact of combustion products with the cylinder wall as well as with a region 408 of the piston that is disposed between the top of the piston and the topmost piston ring seal, which is disposed in groove 108, and which area is prone to collection and accumulation of deposits, can be avoided.

A qualitative illustration of the flow effects within the cylinder created by the airfoil surface 400, together with the protrusion 300, is denoted by arrows in FIG. 10. In this illustration, it is presumed that the piston 100 is moving deeper into the cylinder, for example, during a combustion stroke and while fuel is being injected into the cylinder such as during a continued-burn injection event. In this situation, the fuel injector 308 is shown injecting one or more fuel streams 310 into the cylinder. The fuel streams 310, which may begin atomizing, mixing with surrounding air, and/or burning, may follow paths 312 along the faces of the bowl 110 until they reach the protrusion 300. When reaching the protrusion 300, the paths 312 may curl inward as they are redirected, at least for an instant, by the lower converging surface 304 of the protrusion 300. At the same time, surrounding material, which can include air, may be pulled along the upper converging surface 302 along swirl paths 314 to follow the mass moving along the paths 312. The surrounding air following the moving mass along path 312 and along the swirl paths 314 may, in some conditions, further insulate and contain the burning, moving mass from dispersion in the radially outward portions of the cylinder volume by creating a moving curtain of air around the moving, burning mass.

In addition to these flow effects of the protrusion 300, a further circulation of material may follow the path 316, which curls upwards and away from the piston 100 when flowing into and through the airfoil surface 400. A wall 410 surrounding the airfoil surface 400 and disposed along an outer, upper periphery of the piston 100 forms a ramp that causes any combustion products present in that area to move away from the region 408. The added air moving upward around the burning mass can further serve to provide oxygen for a more complete burn of the fuel present in the moving mass, thus increasing engine efficiency, and insulate the cylinder walls and region 408 from combustion products.

Figure 12:
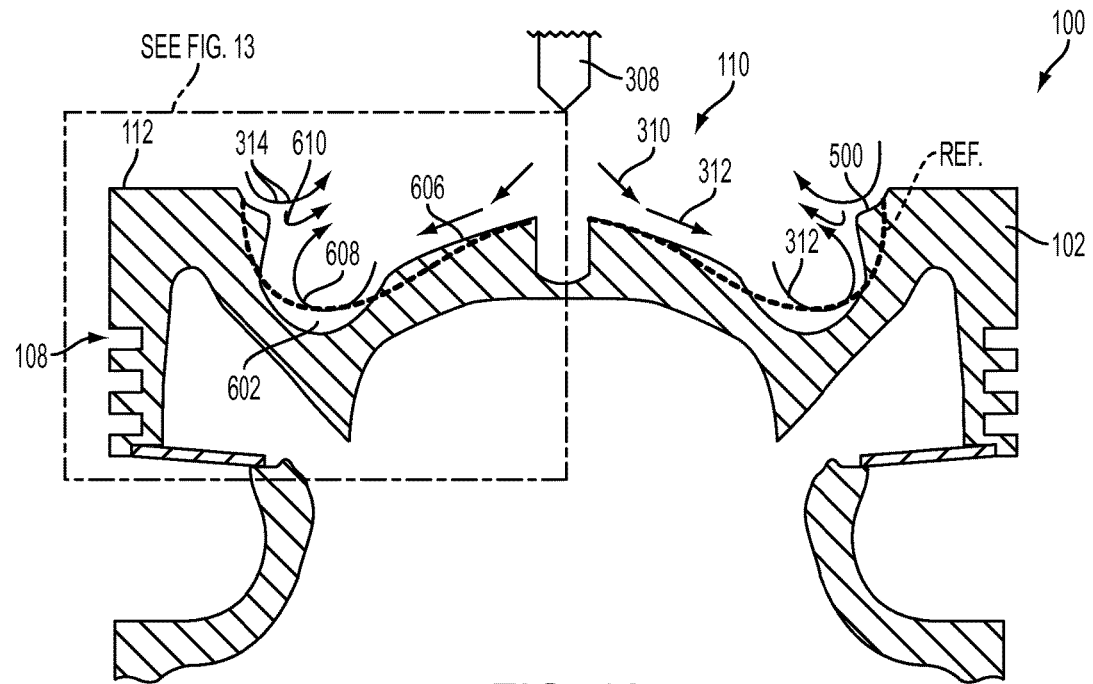
FIGS. 12 and 13 are fragmentary views of a third alternative embodiment for an engine piston in accordance with the disclosure.
Figure 13:
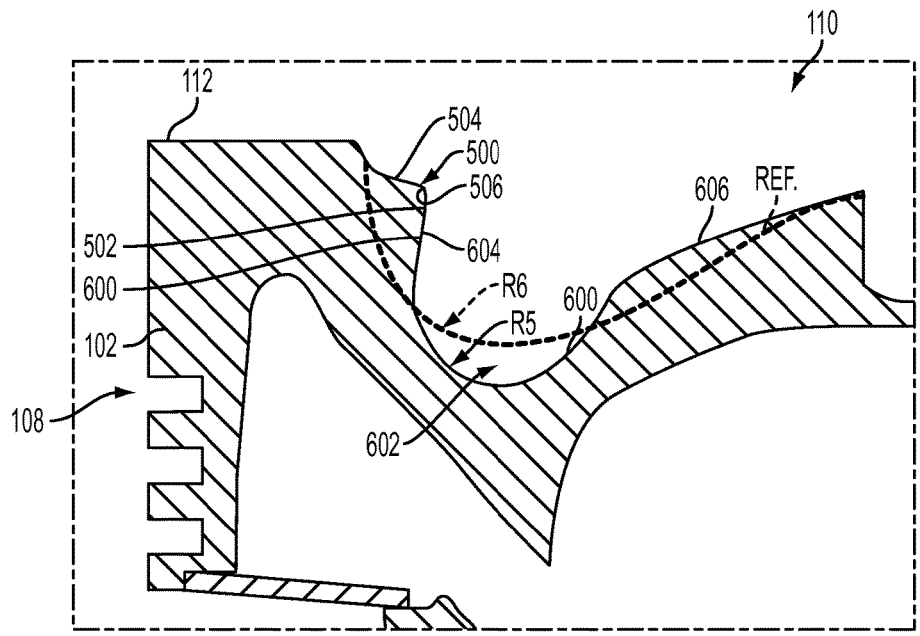

A third alternative embodiment of the piston 100 is shown in the fragmented view of FIG. 12, and a portion thereof is shown in the detail view of FIG. 13. The piston 100 in this embodiment includes a more pronounced annular protrusion 500 than the protrusion 300 shown in the previously described embodiments, as well as a recirculation surface 600 formed within the bowl 110. The annular protrusion 500 includes a lower, partially diverging surface 502, and an upper diverging surface 504 that meet along a convex apex 506. In other words, unlike the two converging surfaces 302 and 304 of the protrusion 300 as shown, for example, in FIG. 9, the pronounced protrusion 500 includes two diverging surfaces surrounding the apex 506, which cooperate with the recirculation surface 600.

The recirculation surface 600 has a generally circular cross section that forms a toroidal cavity 602 that is placed low within the bowl 110. In an alternative embodiment, the recirculation surface may have an elliptical cross section. A portion of the recirculation surface 600 meets the lower, partially diverging surface 502 of the protrusion 500 at an inflection edge 604, which extends peripherally around an edge of the toroidal cavity 602 between the recirculation surface 600 and the lower, partially diverging surface 502 of the protrusion 500. When compared to a baseline piston bowl, the outline of which is denoted by a line (REF.), the recirculation surface 600 is deeper into the piston and formed at a radius, R5, that is less than a baseline radius, R6, of a piston in that area. As shown, R5 is about 23.3 mm. In the cross section shown in FIG. 13, a centerpoint of the radius of the recirculation surface is below the inflection edge 604 in an axial direction with respect to the centerline of the piston and in a direction away from the flat crown surface 112.

A qualitative illustration of the flow effects within the cylinder created by the pronounced protrusion 500 and the recirculation surface 600 is denoted by arrows in FIG. 12. In this illustration, as in the prior illustrations, it is presumed that the piston 100 is moving deeper into the cylinder, for example, during a combustion stroke and while fuel is being injected into the cylinder such as during a continued-burn injection event. In this situation, the fuel injector 308 is shown injecting one or more fuel streams 310 into the cylinder. The fuel streams 310, which may begin atomizing, mixing with surrounding air, and/or burning, may follow paths 312 along inner, shallow faces 606 of the bowl 110 until they reach the recirculation surface 600. When reaching the recirculation surface 600, the combustion materials will sink into the toroidal cavity 602 and assume a swirling pattern 608 at least temporarily within the cavity 602 and generally below the inflection edge 604. A secondary swirl 610 induced by the lower, partially diverging surface 502 may enhance the swirling motion 608 of material within the toroidal cavity 602. To enhance and insulate the swirling material in the cavity 602, surrounding material, which can include air, may be pulled along the upper surface 504 along swirl paths 314 to follow the mass moving along the paths 608 and 610. The surrounding air, or a mixture containing air, the same or a different fuel and/or exhaust gas, following the moving along the swirl paths 314 may, in some conditions, further insulate and contain the burning, moving mass from dispersion in the radially outward portions of the cylinder volume by creating a moving curtain of air around the moving, burning mass.

Figure 14:
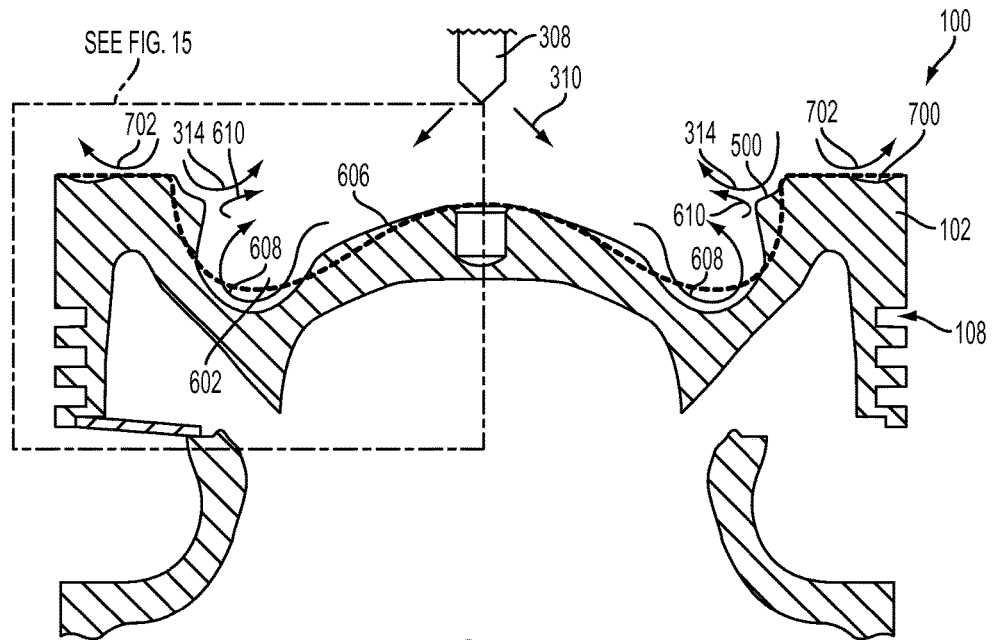
FIGS. 14 and 15 are fragmentary views of a fourth alternative embodiment for an engine piston in accordance with the disclosure.
Figure 15:
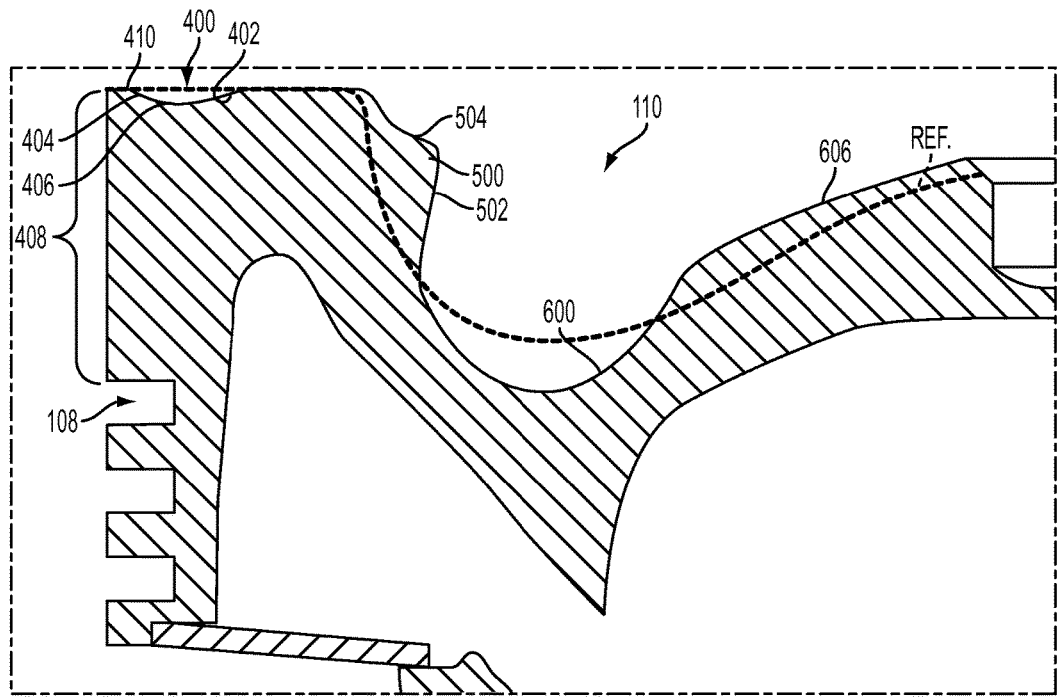

A fourth alternative embodiment of the piston 100 is shown in the fragmented view of FIG. 14, and a portion thereof is shown in the detail view of FIG. 15. The piston 100 in this embodiment includes the pronounced annular protrusion 500, the recirculation surface 600 formed within the bowl 110, and further includes an airfoil surface 400. The airfoil surface 400 is similar to the airfoil surface 400 (FIG. 10), which is formed by an inner diverging surface 402 and an outer converging surface 404 that meet along a concave trough 406. A reference curve, denoted as REF. in the figure, is overlaid to highlight the different in structure between the piston 100 and a baseline piston design. During operation, the airfoil surface 400 causes a moving mass of combustion material, as previously described, that may be travelling along the flat, crown surface 112 to be redirected upwards and away from the piston 100 and the walls of the cylinder in which the piston 100 reciprocates. Such motion is in addition to the swirling pattern 608 within the cavity 602, the secondary swirl 610 induced by the lower, partially diverging surface 502, and the surrounding material that is pulled along the upper surface 504 along swirl paths 314 to follow the mass moving along the paths 608 and 610. A wall 410 surrounding the airfoil surface 700 and disposed along an outer, upper periphery of the piston 100 forms a ramp that causes moving fluids away from the region 408. The added air moving upward around the burning mass can further serve to provide oxygen for a more complete burn of the fuel present in the moving mass, thus increasing engine efficiency, and insulate the cylinder walls and region 408 from combustion products.

INDUSTRIAL APPLICABILITY

Figure 16:
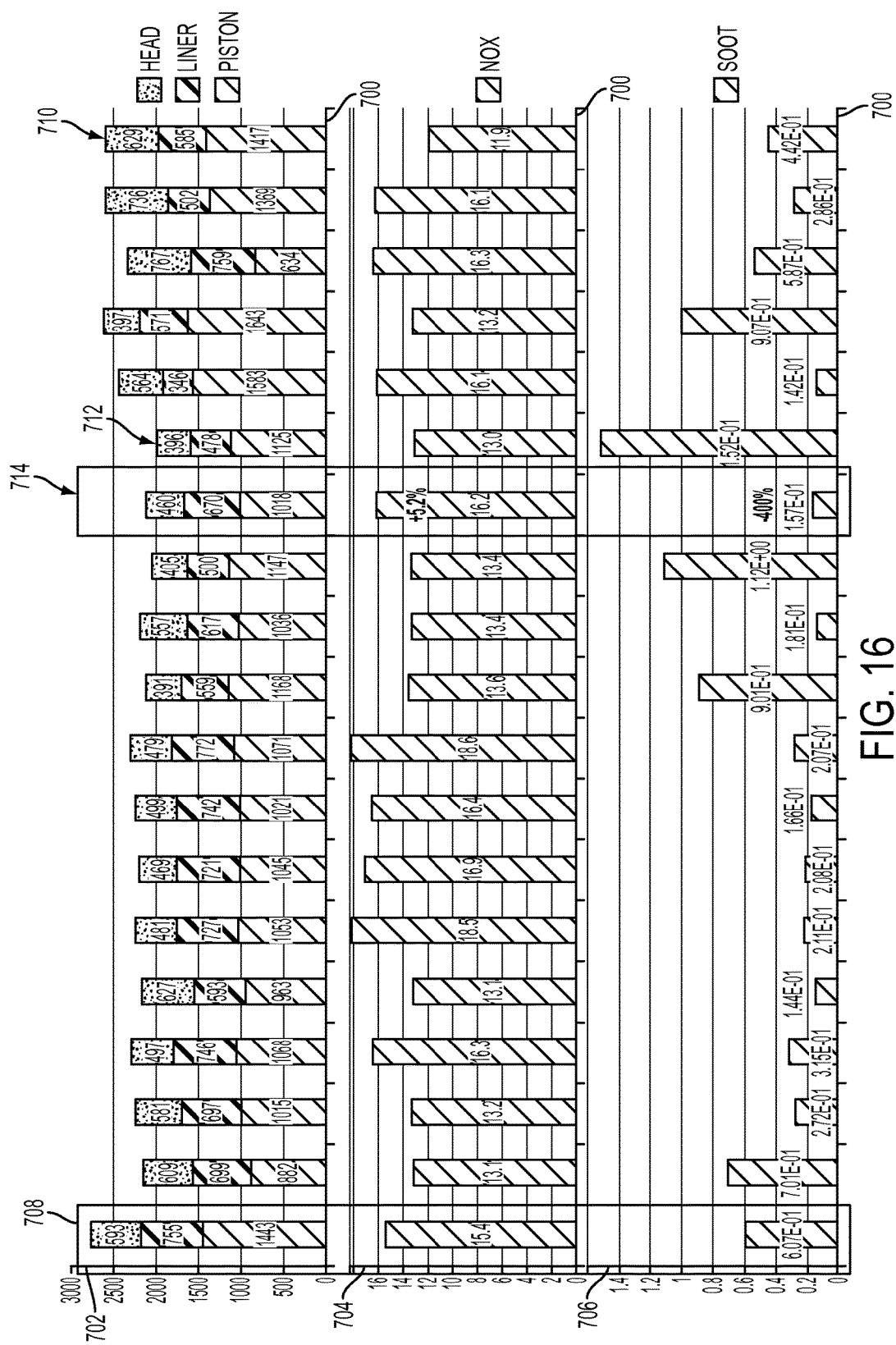
FIG. 16 is a collection of graphs illustrating various engine operating parameters during operation with various engine piston embodiments.

The present disclosure is applicable to pistons for internal combustion engines, which can be used in any application such as land or marine based applications, as well as for mobile or stationary applications. The various embodiments for piston features described herein have been found to have advantages in improving engine operation by increasing power output, decreasing fuel consumption and also decreasing emissions. Various graphs showing the changes in cylinder component operating temperatures and emissions, as indicated by NOx and soot emissions, in engine operation for various embodiments are shown in FIG. 16. The various embodiments considered include different combination of the features described above, including the airfoil surface, annular protrusions, and recirculation cavities, which were used alone or in combinations, as well as changes in the geometrical features for each, including changing the radii of curvature for the various surfaces involved, for example, the radii R1-R5, the relative position between features, and other characteristics. As can be seen from the graphs, the presence and structure of these various features can have an appreciable effect on component temperature, NOx and soot emissions as compared to a baseline piston.

More specifically, FIG. 16 illustrates four different engine operating parameters for 19 different piston configurations, each piston configuration including various features set at various dimensions. The purpose of the investigation was to determine the effect of the various features on the engine operating parameters monitored, and to optimize a piston design for a particular engine application operating under specific parameters in terms of power, fuel timing, ignition timing, and others. In the graphs, each of the 19 alternative piston configurations is arranged along the horizontal axes 700. The total heat rejection, in J/cycle, which is indicative of temperature for the flame deck of the cylinder head, the cylinder wall or liner, and the top of the piston, is plotted in the top chart along the topmost vertical axis 702. NOx concentration, in g/kW-hr., is plotted in the middle graph along the middle vertical axis 704. Soot, also in g/kw-hr., in plotted in the lower chart along the lower vertical axis 706.

With reference to the information shown in the graph of FIG. 16, the leftmost piston design, which is denoted by box 708, for the test conditions applied, showed a total heat rejection of about 2791 J/cycle, a NOx output of about 15.4 g/kw-hr., and a soot output of about 0.607 g/kw-hr. In various other alternative configurations tested, the heat rejection ranged between about 2630 J/cycle, at configuration 710, and 2000 J/cycle, at configuration 712, but with differing NOx and soot emissions, as shown in the graph. Of the configurations tested, an optimal configuration 714 emerged in which to total heat rejection was about 2148 J/cycle, which represents a 23% reduction, NOx was at about 16.2 g/kw-hr., which represented a 5.2% increase, and soot was at about 0.157 g/kw-hr., which represented a 75% reduction. The optimal configuration 714 showed a sufficiently lowered heat rejection to avoid exceeding temperature limits of the surrounding engine components, and a dramatic reduction in soot, even with a slight increase in NOx, both of which can be addressed by the engine aftertreatment systems. In the consideration project that was conducted for the various piston designs using simulation techniques, the piston configuration 714 included an airfoil surface and a recirculation cavity, similar to the embodiment shown in FIGS. 14 and 15.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. The various dimensions described herein will generally refer to nominal dimensions, meaning, those dimensions that might be called out on an engineering drawing but that also may be manufactured within a tolerance of the nominal dimension.

We claim:

1. A piston for an internal combustion engine, the piston comprising:
    a piston body including a crown portion and a skirt portion, the crown portion being radially centered on a longitudinal axis of the piston, the skirt portion defining a bore that is arranged to receive a pin for connecting the piston to a connecting rod, the crown portion defining a bowl surrounded by a flat crown surface having an annular shape and disposed along a plane, the bowl and the flat crown surface meeting along a circular edge surrounding a rim of the bowl;
    an annular protrusion disposed within the bowl adjacent to the rim, the annular protrusion having a generally convex shape in cross section, and including an upper, inwardly extending surface and a lower, inwardly extending surface that meet along a convex apex; and
    an airfoil surface formed in the flat crown surface, the airfoil surface having a concave shape and extending annularly around the rim of the bowl, the airfoil surface including an expanding surface and a converging surface, the expanding surface being disposed between the converging surface and the longitudinal axis of the piston,
    the expanding surface and the converging surface each being recessed below a plane that contains the flat crown surface along a longitudinal direction that is parallel to the longitudinal axis,
    the expanding surface sinking away from the plane that contains the flat crown surface along the longitudinal direction as the expanding surface extends away from the longitudinal axis along a radial direction, the radial direction being perpendicular to the longitudinal axis,
    the converging surface rising toward the plane that contains the flat crown surface along the longitudinal direction as the converging surface extends away from the longitudinal axis along the radial direction,
    a radius of curvature of the expanding surface being larger than a radius of curvature of the converging surface.

2. The piston of claim 1, wherein the expanding surface adjoins the converging surface at a longitudinal trough of the airfoil surface.

3. The piston of claim 1, wherein the airfoil surface creates an airfoil effect that redirects moving fluids entering the airfoil surface upward and away from the piston along the longitudinal direction.

4. The piston of claim 1, wherein the radius of curvature of the expanding surface has a nominal dimension of 47.3 mm.

5. The piston of claim 4, wherein the radius of curvature of the converging surface has a nominal dimension of 2.6 mm.

6. The piston of claim 5, wherein an overall width of the airfoil surface in the radial direction has a nominal dimension of 13.9 mm.

7. The piston of claim 1, further comprising a cylindrical wall surrounding the airfoil surface and disposed along an outer, upper periphery of the crown portion.

8. The piston of claim 1, wherein the annular protrusion extends peripherally around the bowl.

9. The piston of claim 1, wherein the annular protrusion is disposed at a height below the rim.

10. The piston of claim 1, wherein the upper, inwardly extending surface is a converging surface.

11. The piston of claim 1, wherein lower, inwardly extending surface is a converging surface.

12. The piston of claim 1, wherein the annular protrusion is formed on a sleeve, the sleeve being ring-shaped and connected to the piston along the rim.

13. The piston of claim 12, wherein the sleeve has a generally L-shaped cross section.

14. The piston of claim 1, wherein the annular protrusion is integrally formed with a parent material of the piston.

15. The piston of claim 1, wherein the upper, inwardly extending surface is formed at a first cross-sectional radius, and wherein the lower, inwardly extending surface is formed at a second cross-sectional radius, the first cross-sectional radius being different from the second cross-sectional radius.

16. The piston of claim 15, wherein the first cross-sectional radius is larger than the second cross-sectional radius.

17. The piston of claim 16, wherein the first cross-sectional radius has a nominal dimension of 13.5 mm, and the second cross-sectional radius has a nominal dimension of 6.9 mm.

18. The piston of claim 1, wherein a convex portion of the upper, inwardly extending surface adjoins a convex portion of the lower, inwardly extending surface at an apex of the annular protrusion.

\* \* \* \* \*